United States Patent
Kecht et al.

(10) Patent No.: US 10,821,766 B2
(45) Date of Patent: Nov. 3, 2020

(54) CORE-SHELL PARTICLE-BASED SECURITY PIGMENT, AND PRODUCTION METHOD

(71) Applicant: GIESECKE+DEVRIENT CURRENCY TECHNOLOGY GMBH, Munich (DE)

(72) Inventors: Johann Kecht, Munich (DE); Axel Schlossbauer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 270 days.

(21) Appl. No.: 15/773,869

(22) PCT Filed: Nov. 9, 2016

(86) PCT No.: PCT/EP2016/001862
§ 371 (c)(1),
(2) Date: May 4, 2018

(87) PCT Pub. No.: WO2017/080653
PCT Pub. Date: May 18, 2017

(65) Prior Publication Data
US 2018/0326776 A1   Nov. 15, 2018

(30) Foreign Application Priority Data
Nov. 11, 2015   (DE) .................... 10 2015 014 537

(51) Int. Cl.
| | | |
|---|---|---|
| *B42D 25/382* | (2014.01) | |
| *C09D 11/037* | (2014.01) | |
| *C09D 11/103* | (2014.01) | |
| *C09D 11/107* | (2014.01) | |
| *C09D 11/50* | (2014.01) | |
| *C08L 61/28* | (2006.01) | |
| *C09B 67/08* | (2006.01) | |
| *C09B 67/02* | (2006.01) | |
| *C08L 25/06* | (2006.01) | |
| *C08L 33/12* | (2006.01) | |
| *B42D 25/387* | (2014.01) | |
| *C08L 61/30* | (2006.01) | |
| *C09B 67/00* | (2006.01) | |
| *C09K 11/06* | (2006.01) | |
| *C08L 61/06* | (2006.01) | |
| *C08L 61/24* | (2006.01) | |
| *C09D 11/10* | (2014.01) | |
| *C08L 61/12* | (2006.01) | |
| *C08L 61/34* | (2006.01) | |
| *C09D 11/106* | (2014.01) | |
| *C08K 3/013* | (2018.01) | |
| *C08K 5/00* | (2006.01) | |
| *B42D 25/378* | (2014.01) | |

(52) U.S. Cl.
CPC .......... *B42D 25/382* (2014.10); *B42D 25/378* (2014.10); *B42D 25/387* (2014.10); *C08K 3/013* (2018.01); *C08K 5/0041* (2013.01); *C08L 25/06* (2013.01); *C08L 33/12* (2013.01); *C08L 61/06* (2013.01); *C08L 61/12* (2013.01); *C08L 61/24* (2013.01); *C08L 61/28* (2013.01); *C08L 61/30* (2013.01); *C08L 61/34* (2013.01); *C09B 67/00* (2013.01); *C09B 67/0013* (2013.01); *C09B 67/0097* (2013.01); *C09D 11/037* (2013.01); *C09D 11/10* (2013.01); *C09D 11/103* (2013.01); *C09D 11/106* (2013.01); *C09D 11/107* (2013.01); *C09D 11/50* (2013.01); *C09K 11/06* (2013.01); *C08L 2207/53* (2013.01)

(58) Field of Classification Search
CPC .......... B01J 13/16; B42D 25/29; B42D 25/30; B42D 25/355; B42D 25/373; B42D 25/378; B42D 25/382; B42D 25/387; C08L 61/06; C08L 61/12; C08L 61/28; C08L 61/30; C08L 61/34; C09B 67/0013; C09B 67/0033; C09B 67/0097; C09D 11/037; C09D 11/50; C09D 11/54; D21H 21/30; D21H 21/40; C08G 12/34; C08G 14/10; C08G 8/24; C09K 2211/1007; C09K 2211/1018; C09K 2211/1475; C09K 2211/1491; C09K 11/025; C09K 11/06; C09K 9/02; G07D 2207/00; G07D 7/003; G07D 7/1205
See application file for complete search history.

(56) References Cited

U.S. PATENT DOCUMENTS

| | | |
|---|---|---|
| 4,406,816 A | 9/1983 | Sliwka |
| 4,833,311 A | 5/1989 | Jalon |
| 4,891,505 A | 1/1990 | Jalon |

(Continued)

FOREIGN PATENT DOCUMENTS

| | | |
|---|---|---|
| DE | 19546757 A1 | 6/1996 |
| DE | 102006008245 A1 | 8/2007 |

(Continued)

OTHER PUBLICATIONS

International Search Report from PCT Application No. PCT/EP2016/001862, dated Feb. 1, 2017.

*Primary Examiner* — Irina S Zemel
(74) *Attorney, Agent, or Firm* — Workman Nydegger

(57) ABSTRACT

The invention relates to a security pigment of core-shell particles with an organic or metalorganic feature substance, in particular luminescent feature substance, present in dissolved or finely distributed form in the core. The invention further relates to a method for producing the core-shell particles and value documents having the core-shell particles.

6 Claims, No Drawings

(56) References Cited

U.S. PATENT DOCUMENTS

| | | | | |
|---|---|---|---|---|
| 5,304,448 A | * | 4/1994 | Keoshkerian | G03G 9/09328 430/110.2 |
| 5,677,100 A | * | 10/1997 | Asano | G03G 9/09314 430/110.2 |
| 6,261,483 B1 | | 7/2001 | Frank et al. | |
| 2003/0055115 A1 | | 3/2003 | Ninomiya et al. | |

FOREIGN PATENT DOCUMENTS

| | | |
|---|---|---|
| DE | 102006008247 A1 | 8/2007 |
| EP | 0026914 B1 | 10/1982 |
| EP | 0256922 B1 | 7/1991 |
| EP | 1208382 B1 | 4/2006 |
| EP | 0978312 B2 | 4/2007 |
| EP | 1438126 B1 | 7/2012 |
| JP | H06148925 A | 5/1994 |

\* cited by examiner

CORE-SHELL PARTICLE-BASED SECURITY PIGMENT, AND PRODUCTION METHOD

BACKGROUND

The invention relates to a security pigment based on core-shell particles and a method of producing the same. The invention relates in particular to a special method of producing core-shell particles from two different polymers. Preferably, a non-crosslinked, less polar polymer, such as for example polymethyl methacrylate (PMMA), is employed as core material and a strongly crosslinked, polar polymer, such as for example melamine-formaldehyde resin (MF) is employed as shell material.

The object of the present invention is to supply a feature substance that is improved vis-à-vis the state of the art. Further, the object of the present invention is to supply a method improved vis-à-vis the state of the art of producing a feature substance.

These objects are achieved by the combinations of features defined in the independent claims. Developments of the invention are the subject matter of the subclaims.

SUMMARY OF THE INVENTION 1. (First aspect) A method for producing a security pigment of core-shell particles, comprising a solid core based on a thermoplastic polymer, a shell based on a condensation polymer and an organic or metalorganic feature substance present in dissolved or finely distributed form in the core, having a) the step of dissolving the feature substance together with the thermoplastic polymer in an organic solvent and dispersing the obtained solution in water by means of a surfactant;

b) supplying at a certain pH value the prepolymer units to be polymerized in a condensation reaction, in order to achieve the condensation of the shell-forming polymer around the dispersed droplets of the organic solvent;

c) removing the organic solvent in order to form the core-shell particles with a solid core;

and optionally d) reinforcing the shell of the core-shell particles by adding further prepolymer units to be polymerized.

2. (preferred) The method according to paragraph 1, wherein the thermoplastic polymer is selected from polystyrene (PS), polyacrylates, polyethylene (PE), polypropylene (PP), polycarbonates (PC), polyamides (PA), polyurethanes (PU), polyureas (PH), polyethylene terephthalate (PET) or other polyesters, preferably from polystyrene (PS) or from one of the polyacrylates polymethyl methacrylate (PMMA), polyvinyl acetate (PVAC), polyvinyl chloride (PVC), polyacrylonitrile (PAN), particularly preferably from polystyrene (PS) or polymethyl methacrylate (PMMA).

3. (preferred) The method according to paragraph 1 or 2, wherein the condensation polymer is selected from aminoplasts, phenoplasts, melamine-formaldehyde resins (MF), melamine-phenol-formaldehyde resins (MPF), phenol-formaldehyde resins (PF), urea-formaldehyde resins (UF), melamine-guanidine-formaldehyde resins or phenol-resorcin-formaldehyde resins.

4. (preferred) The method according to any one of paragraphs 1 to 3, wherein the feature substance is a fluorescent or phosphorescent or photochromic or thermochromic feature substance or a UV or IR or VIS absorption dye.

5. (preferred) The method according to any one of paragraphs 1 to 4, wherein the security pigment is stable against toluene, ethyl acetate, hydrochloric acid (5%), sodium hydroxide solution (2%) and sodium hypochlorite solution (5% active chlorine) in accordance with test method A5, preferably A30, wherein the feature intensity remaining after the test is higher than 80% of the initial intensity.

6. (preferred) The method according to any one of paragraphs 1 to 5, wherein the thermoplastic polymer of the obtained core-shell particle is of polymethyl methacrylate (PMMA) or polystyrene (PS) and the shell of the obtained core-shell particle is of melamine-formaldehyde resin (MF).

7. (Second aspect) A security pigment of core-shell particles, comprising a core based on a thermoplastic polymer, a shell based on a condensation polymer and an organic or metalorganic feature substance present in dissolved or finely distributed form in the core, obtainable by the method according to any one of paragraphs 1 to 6.

8. (preferred) The security pigment according to paragraph 7, wherein the core-shell particle comprises exactly one core and a shell.

9. (preferred) The security pigment according to paragraph 7 or 8, wherein the fluorescent or phosphorescent feature substance is excitable in the UV spectral range, in particular at a wavelength of 365 nm, and emits in the visible spectral range.

10. (preferred) The security pigment according to any one of paragraphs 7 to 9, wherein the fluorescent or phosphorescent feature substance emits in the IR spectral range, preferably between 700 nm and 2,500 nm.

11. (preferred) The security pigment according to any one of paragraphs 7 to 10, wherein in the core two different luminescent dyes are present in finely distributed or dissolved form, which form an energy transfer system in which the first luminescent dye after excitation transfers its excitation energy partially or completely to the second luminescent dye.

12. (preferred) The security pigment according to any one of paragraphs 7 to 11, wherein the security pigment is stable against toluene, ethyl acetate, hydrochloric acid (5%), sodium hydroxide solution (2%) and sodium hypochlorite solution (5% active chlorine) in accordance with test method A5, preferably A30, wherein the feature intensity remaining after the test is higher than 80% of the initial intensity.

13. (preferred) The security pigment according to any one of paragraphs 7 to 12, wherein the security pigment is stable against acetone in accordance with test method A5, wherein the feature intensity remaining after the test is higher than 80% of the initial intensity.

14. (Third aspect) Employment of a security pigment according to any one of paragraphs 7 to 13 in an ink concentrate or a printing ink, in particular for offset printing, screen printing or steel intaglio printing.

15. (Fourth aspect) Employment of a security pigment according to any one of paragraphs 7 to 13 in a polymer composition, preferably in a value document substrate, a security foil, a mottling fiber or a security thread.

16. (Fifth aspect) A value document, mottling fiber, security thread or security foil with a security pigment according to any one of paragraphs 7 to 13.

DETAILED DESCRIPTION OF THE INVENTION

The object of the invention is a special method for producing core-shell particles from two different polymers. Preferably, a non-crosslinked, less polar polymer, such as for example polymethyl methacrylate (PMMA), is employed as core material and a strongly crosslinked, polar polymer, such as for example melamine-formaldehyde resin (MF) is employed as shell material.

Therein, solvent-containing drops are formed, enveloped and subsequently the solvent is removed in order to finally obtain enveloped, solid cores.

The non-crosslinked (core) polymer is dissolved together with a feature substance in an organic solvent and dispersed in the form of small droplets with the aid of an emulsifier. Subsequently, the droplets are enveloped by weakly crosslinked shell material, the solvent is removed from the core (causing the core polymer to precipitate in the core together with the feature substance distributed therein), and the shell is subsequently finished by further crosslinking.

By embedding feature substances in the core, their stability against external influences (e.g. organic solvents, the action of acids and bases) is massively increased, thus making possible and/or improving their applicability in the field of banknotes.

As a crosslinked, strongly polar polymer, the MF shell protects the feature substance against non-polar organic solvents in particular. The core of PMMA (less polar polymer) protects the feature substance against aqueous or strongly polar solvents that could diffuse through the MF. Further, PMMA absorbs most feature substances very well, thus making possible their homogeneous distribution in the core material. However, in the method according to the invention also other polymer types can be employed in addition to PMMA and MF to prepare core-shell particles.

The production method according to the invention for the core-shell particles combines advantageously the methods of the solvent evaporation process and of the MF encapsulation, which have been used in different fields for completely different purposes so far, thus surprisingly achieving a stabilization of security pigments against diverse chemical attacks.

The solvent evaporation process is often used in the fields of pharmacy and/or micro-biology, in order to embed hydrophobic substances (e.g. drugs) in a polymer and/or envelop them with a polymer (see e.g. Tice et al., "Preparation of injectable controlled-release microcapsules by a solvent-evaporation process", Journal of Controlled Release, 2 (1985) 343-352). Here, the substance is dissolved together with a matrix material (e.g. a polymer) in an organic solvent and dispersed in water (often together with an emulsifier). Through evaporation of the solvent, the matrix material and the substance contained therein precipitate in the form of small spherical particles or micro capsules. However, no core-shell particles are formed here; in particular no shell is attached surrounding the solvent droplets before the matrix material is precipitated therefrom.

The encapsulation of solvent droplets and other liquids with MF and other polymers as shell material is known in the fields of the production of detergents or cosmetics. Typical application fields are often the preparation of pressure-sensitive micro capsules (for example for the release of fragrances upon rubbing a surface) or slowly permeable micro capsules (for example for the controlled release of drugs and pesticides). See for example EP 0 978 312 B2, EP 1 438 126 B1 and EP 0 026 914 B1.

The core material most frequently remains liquid for the final application, or there is a temperature-related phase change which causes e.g. liquid wax in the core material to be cured and thus form a solid wax core.

In rare cases it is possible to envelop a solid core material with MF directly. For example, the example 6 in EP 1 208 382 B1 describes the enveloping of fluorescent particles with MF. However, this is limited to a small number of individual substances and accordingly substantially limits the employable feature substances.

The enveloping of solvent-containing drops and the subsequent removal of the solvent in order to finally obtain enveloped solid cores is not described in the state of the art, however.

Further, the documents DE 10 2006 008 245 A1 and DE 10 2006 008 247 A1 address the general preparation of security features on the basis of core-shell particles. However, there, solid core particles are encapsulated with a (any desired) shell, so that a separation of the core particles is always required prior to the encapsulation step. This leads to technical difficulties in the separation and increases the process costs.

The solvent-evaporation process has been used so far for preparing spherical polymer particles with substances, such as e.g. drugs, dissolved therein and/or dispersed in the core of the particle. An enveloping of a solid core with a shell of a second polymer is not customary here and/or is even counterproductive for the pharmaceutical application:

In the MF micro encapsulation, usually a liquid phase present in the form of dispersed droplets is micro-encapsulated. The preparation of an envelope of a solid phase around core-shell particles is not customary, since it is much easier technically to envelop a liquid core.

According to the invention, parts from both methods are combined for enveloping the liquid droplets of the solvent-evaporation method with MF before the polymer in the core precipitates.

The first process step is based on the emulsification of droplets of organic solvents in water. Only such solvents are suitable for this which form a separate phase in water, i.e. which are not or hardly mixable with water. Among these are for example certain esters, such as ethyl acetate, certain aromatic solvents such as toluene and benzene, certain ethers such as THF and certain halogenated solvents. Preferably, as the organic solvent a chlorinated solvent is employed, such as e.g. chloroform, dichloromethane, 1,1,1-trichloroethane, trichloroethylene or tetrachloroethylene.

All polymers soluble in the preferred organic solvents are suitable as the core material, preferably polymers soluble in chlorinated solvents. In order to increase solubility, the polymers of the core material are preferably unbranched or only weakly branched.

The chain length of the polymers of the core material here are preferably in the range from 1,000 to 1,000,000 g/mol, particularly preferably at 50,000 to 250,000 g/mol.

The polymer of the core material consists of thermoplastics, preferably of a thermoplastic, non-crosslinked polymer. According to a preferred embodiment, the polymer of the core material consists of polymerized ethylene derivatives, particularly preferably of polystyrene (PS) or polyacrylates, including preferably polymethyl methacrylate (PMMA), polyvinyl acetate (PVAC), polyvinyl chloride (PVC), polyacrylonitrile (PAN) or of a copolymer containing two or several of these polymers, such as e.g. acrylonitrile-butadiene-styrene copolymer (ABS). According to a further preferred embodiment, the ethylene derivatives are polyethylene (PE), polypropylene (PP) or other polymers constructed from aliphatic carbon chains.

According to a further preferred embodiment, the polymer of the core material consists of polycarbonates (PC), polyamides (PA) or polyesters, such as polyethylene terephthalate (PET).

As surfactants and/or emulsifiers such substances are suitable which can disperse the corresponding organic solvent in water, for example nonionic surfactants, anionic surfactants, cationic surfactants, amphoteric surfactants. Preferably, anionic surfactants are employed, or a mixture of anionic surfactants and unionic surfactants. Preferred anionic surfactants are sulfate-based surfactants, e.g. fatty alcohol sulfates (alkyl sulfates) or fatty alcohol ether sulfates. According to a further embodiment, the preferred anionic surfactants are caboxylate-based surfactants, e.g. alkyl carboxylates. According to a further embodiment, the preferred anionic surfactants are sulfonate-based surfactants, e.g. alkyl sulfonates. According to a further embodiment, the preferred anionic surfactants are phosphate-based surfactants, e.g. alkyl ether phosphates.

Anionic surfactants have the advantage that the attachment of positively charged condensation products from the forming of the shell is promoted by the negative charge of the head group.

Preferably, the surfactants are used in an amount of 0.0001 to 10 wt.-% of the aqueous solution, further preferably 0.1 to 5 wt.-%, particularly preferably 0.5 to 2 wt.-%.

The organic phase containing the polymer (and the feature) is dispersed in the aqueous phase with the aid of the surfactant.

Preferably, the proportion of the dissolved polymer in the organic solvent amounts to 1 to 20%, particularly preferably 3 to 10%.

Preferably, the proportion of the organic phase amounts to 1 to 60 vol.-% of the phase mixture, particularly preferably 10 to 30 vol.-%. When the proportions are smaller, only small yields are achieved; when the proportions are larger, the homogeneous dispersion of the organic phase is made difficult; both of which has a detrimental effect on the efficiency of the method.

The dispersion of the organic phase in the aqueous phase is preferably effected mechanically, for example by stirring, ultrasound or special devices for the targeted incorporation of shear forces. Preferably, homogenizing systems are employed, such as e.g. so-called homogenizer aggregates or rotor-stator systems, such as e.g. systems of the type Ultra-Turrax of the company IKA.

The dispersion of the organic phase in the aqueous phase can be effected once or continuously. In a one-time dispersion, the dispersion is adjusted at the start of the reaction, e.g. by brief treatment with a homogenizing system, and in the further course is e.g. only stirred or intermixed by a second system not suitable for dispersion. The homogenizing system is thus used only for a short time, but the dispersion remains stable also without further use. In a continuous dispersion the homogenizing system is used over the complete reaction time. Here, usually no second system is required for stirring/intermixing the reaction solution.

The polymers of the shell material are preferably strongly crosslinked thermoplastics, particularly condensation polymers. According to a preferred embodiment, the polymer of the shell material consists of units polymerized through condensation reactions, such as e.g. aminoplasts and phenoplasts, particularly preferably of aminoplasts. Preferably, these are melamine-formaldehyde resins (MF), melamine-phenol-formaldehyde resins (MPF), phenol-formaldehyde resins (PF), urea-formaldehyde resins (UF) and types of resin related thereto, e.g. melamine-guanidine-formaldehyde resins or phenol-resorcin-formaldehyde resins. According to a further preferred embodiment, the formaldehyde in the resin material is completely or partially replaced by a different aldehyde, e.g. by furfural.

According to a further preferred embodiment, the polymer of the shell material consists of polyaddition products, preferably polyaddition products with isocyanate-containing monomers. Preferably, these are strongly crosslinked polyurethanes (PU) and/or polyureas (PH).

For the preparation of the shell preferably a water-soluble prepolymer is used. Both commercially available prepolymers (e.g. Cymel 300 from the company Allnex) or prepolymers produced from the respective single components, e.g. melamine and formaldehyde, by heating in an aqueous solution can be used here.

Preferably, the prepolymer contains methylolized amines, particularly preferably methylolized melamine.

The prepolymer can be incorporated into the aqueous phase before, during or after the incorporation and dispersion of the organic phase and the aqueous phase. Preferably, the prepolymer is added after the dispersion of the organic phase, since a more homogeneous droplet size of the dispersed phase is often reached thereby.

According to a preferred case of application, the complete required amount of prepolymer is added at once.

According to a further preferred case of application, the required amount of prepolymer is added in portions, for example one half at the start of the reaction and the second half after removing the organic solvent.

According to a further preferred case of application, the prepolymer is added continuously over the complete reaction time or over parts of the reaction time, for example via an electronically controlled dosing pump.

The amounts added and the times of addition can influence the tightness of the formed shell, since e.g. gaps created in a first step of the shell formation can be closed again by addition in portions and a more controlled growth of the layer becomes possible overall. It is particularly preferred to add a part of the prepolymer only after the organic solvent has been removed completely.

If the complete prepolymer is added only after the removal of the organic solvent, no sealing layer formation will take place. The presence of the organic solvent is an integral constituent for the attachment of the MF shell; an attachment to "naked", already precipitated core material does not take place.

To control the speed and the degree of polymerization of the prepolymer, the pH value is adjusted. The adjustment can take place at the start of the reaction and remain constant or can be changed in steps or continuously. According to a preferred embodiment, the pH value is adjusted at the start and maintained constant over the reaction time. According to a further preferred embodiment, the pH value is adapted at certain points in time of the reaction process, for example the pH value is not adapted at the start of the reaction, adjusted by adding an acid at a later point in time and adjusted to a second value by adding further acid at a still later point in time. According to a further preferred embodiment, the pH value is adapted continuously over the complete reaction process or over parts of the reaction process, for example b an electronically controlled dosing pump which doses an acid solution into the reaction solution.

The adaptation of the pH value is effected by adding acids or buffer systems. Preferably, organic acids of a $pK_s$ value in a range of 3.5 to 5.5 are used, for example acetic acid, or buffer systems based on such acids and their salts, for example a formic-acid-formiate buffer.

The adaptation of the pH value is effected here preferably within a range of pH 7 to pH 2, particularly preferably pH 6 to pH 3.

Independently of the reaction process of the condensation reaction of the shell, a lowering of the pH value (also to lower values, such as pH 1) can be effected at the end of the reaction to facilitate the further processing (filtering) through an agglomeration of the particles.

In addition to the pH value, the temperature of the reaction solution is an important control parameter for both the condensation reaction of the shell material and for the removal of the organic solvent. According to a preferred embodiment, the temperature is increased in stepwise fashion, e.g. from room temperature to 40° C. after a certain reaction time, and then from 40° C. to 80° C. after a certain further reaction time. According to a further preferred embodiment, the temperature is changed continuously over the complete reaction time or over parts of the reaction time.

According to a preferred embodiment, the temperature for removing the organic solvent is maintained near the boiling point of the organic solvent. Preferably, the maintained temperature is no further away than 10° C. from the boiling point of the solvent here, particularly preferably no less than 5° C. Preferably, the maintained temperature is not at or over the boiling point of the organic solvent, however, since the integrity of the shell can be reduced thereby.

According to a preferred embodiment, a negative pressure is applied instead of or in addition to the elevation of the temperature, in order to reach the removal of the organic solvent.

According to a preferred embodiment, the removal of the organic solvent is effected without applying negative pressure and without additional temperature elevation, by stirring at room temperature over a certain period of time.

The curing of the shell material preferably takes place in the temperature range from 50° C. to 100° C., particularly preferably in the temperature range from 70 to 80° C.

Preferably, the removal of the solvent takes place over a time period of at least 20 minutes, wherein the time period particularly preferably is at least 1 h. Preferably, the curing of the shell material takes place preferably over a time period of at least 30 minutes, wherein the time period particularly preferably is at least 1 h.

The size of the resulting core-shell particles amounts to between 0.05 μm to 100 μm, preferably 0.1 μm to 20 μm, further preferably 0.5 μm to 5 μm, particularly preferably 1 μm to 3 μm.

In a preferred case of application core-shell particles are prepared with a thick shell configured to protect the core material as effectively as possible. Here, the mass fraction of the shell preferably amounts to more than 20% of the mass of the core material, further preferably more than 50% of the mass of the core material, particularly preferably more than 100% of the mass of the core material.

In a further preferred case of application, core-shell particles are prepared with a thin shell which likewise contributes to protection, but is insufficient for a complete stabilization of the particle against environmental influences. Here, the role of the shell is that of an intermediary layer, which allows for embedding the core-shell particles in plastics. In this case, the mass fraction of the shell preferably amounts to less than 20% of the mass of the core material.

By embedding in the polymer, the surrounding polymer acts as additional protection, so that sufficient stabilities are reached also with a thin shell. In this manner, for example luminescent foil elements, such as holograms or security threads for banknotes, can be generated, which have a high stability against chemicals and a high luminescence intensity at the same time. The shell here provides additional protection in comparison to "naked" core particles in the polymer and, depending on the embedding polymer employed, can also facilitate dispersion in this polymer and/or prevent a dissolution of the core particles in the polymer or a diffusion of the feature from the core into the surrounding polymer. In a special preferred embodiment the thin shell can bind to the surrounding polymer covalently, whereby both a permanent anchoring and a better dispersion in the surrounding polymer can be reached.

The proportion of the feature substance in the core material preferably amounts to between 0.01 to 100 weight percent, further preferably between 0.1 to 30 weight percent, particularly preferably between 1 and 10 weight percent.

The particles according to the invention protect the feature substance contained therein against harmful external influences, such as for example extraction through organic solvents or decomposition through aqueous acids and bases. For example, for common solvents such as acetone, ethyl acetate, ethanol, toluene, etc., retention rates of over 90% are observed even after over 1 h residence time of the particles in the medium. In contrast, an equivalent sample without duromer shell shows, for example in the same solvent, a retention rate of significantly below 10% already after one minute, i.e. the feature substance is extracted.

When a qualitative stability test of print samples is carried out, frequently a classification is applied to visible effects, such as e.g. luminescent pigments, which is subdivided into the following levels:
4: no visible change
3: slight change
2: significant change, less than 50% damaged
1: strong change, more than 50% damaged
0: element destroyed Qualitatively, the assessment of stability in the case of VIS-absorbing or luminescent feature substances is effected by means of the above-mentioned levels 0-4 by observing the excited proof with the eye.

Quantitatively, the assessment is effected by machine measurement, for example in the case of luminescence-based feature substances by measuring the emission spectrum with the aid of a fluorescence spectrometer, or in the case of absorption-based feature substances by measuring the absorption spectrum with the aid of a UV/VIS/NIR spectrometer.

According to experience, luminescent proofs with the level 4 ("no visible change") have a luminescence intensity remaining after the test of over 80% with reference to the initial luminescence intensity. Analogously, for other feature substances a remaining signal intensity of over 80% with reference to the initial signal intensity is likewise considered equivalent to "level 4". This is referred to below also as a stability of over 80%.

To be able to assess the stability of the security pigments qualitatively and quantitatively, a test method close to the application is described in the following.

Test method A5 and/or A30:
Incorporating the security pigments in an offset lacquer having a pigmentation of 15 weight percent with a three-roll mill
Proofing the thus obtained printing ink in offset printing with a weight of the proof of 2 g/m² on a value title paper ("banknote paper")
Drying the proof at 60° C. for 12 h
Immersing the proof (or a cut-off portion of the proof) in the respective test substance against which the stability of the proof is to be ascertained for a period of 5 minutes (A5) or 30 minutes (A30)

Removing the proof from the test substance and washing off adhering test substance with water Drying the proof at 60° C. for 2 h The quantitative stability of the proof against the test substances results from the comparison of the signal intensity of the proof before and after treatment with the test substance (or the comparison of an untreated portion of the proof with a treated portion of the same proof); stability=(intensity after treatment with solvent)/(intensity before treatment with solvent).

The security pigments on the basis of core-shell particles of the present invention in proofs reach the highest level 4 or a stability of >80% for application-relevant solvents, acids and bases, even if proofs of the same unprotected feature substance reach only the lowest level 0.

According to a preferred embodiment, the highest stability level "no visible change" or a stability >80%, preferably>90%, is given in the following application-relevant solvent tests in accordance with test method A5, particularly preferably in accordance with test method A30:

Determination of stability against polar organic solvents (test substance ethyl acetate), non-polar organic solvents (test substance toluene), aqueous acids (test substance HCl, 5 weight percent), aqueous bases (test substance NaOH, 2 weight percent), as well as aqueous redox-active solutions (test substance sodium hypochlorite solution, 5% active chlorine). The exposure time is 5 or preferably 30 minutes to ensure that a sufficiently long contact is established between the security pigment and the test substance.

According to a further preferred embodiment, the mentioned stabilities are fulfilled also for the following application-relevant solvents:

ethanol
trichloroethylene
tetrachloroethylene
xylene
benzine
sodium sulfite solution (10 weight percent)
sulfuric acid (2 weight percent)
ammonia solution (10 weight percent)

According to a preferred embodiment, the security pigments themselves are stable even against particularly aggressive chemical solvents for at least 5 minutes, for example acetone. In particular, acetone is able to attack the majority of organic feature substances of the state of the art.

In general, it should be noted that the printing lacquer employed for the test and/or the substrate which is printed has to be stable itself in the test; this is generally fulfilled for the lacquers and substrates employed in the security printing of value documents. The stability of the printing lacquer/substrate can be checked for example with inert luminescent substances (e.g. inorganic phosphors) or inert absorbing substances (e.g. inorganic color pigments).

As feature substances predominantly organic or metalorganic molecules are suitable that can be dissolved in non-polar organic solvents. The incorporation of inorganic pigment particles or quantum dots, etc. is difficult and therefore not preferred.

According to a preferred embodiment the feature substance is a luminescent dye. According to a preferred embodiment the luminescent dye is a fluorescent dye. According to a further preferred embodiment the luminescent dye is a phosphorescent dye. According to a further preferred embodiment the luminescent dye is a luminescent dye excitable in the UV range, which emits in the visible spectral range. According to a further preferred embodiment said luminescent dye is one that is excitable in the visible spectral range, which emits in the visible spectral range. According to a further preferred embodiment the luminescent dye is one that emits in the infrared range. The dyes can be both purely organic molecules and metalorganic complexes.

According to a preferred embodiment two or more fluorescent or phosphorescent luminescent dyes are mixed to create an energy transfer system or FRET system, in which the first luminescent dye after excitation can emit its excitation energy partially or completely to the second luminescent dye. In the case of such a FRET system one of the luminescent dyes involved is preferably excitable in the UV range and emits in the visible spectral range, while the other luminescent dye is excitable in the visible spectral range and emits in the visible spectral range.

Examples of substance classes of luminescent dyes which are UV-excitable or excitable in the visible spectral range and which emit in the visible spectral range, are purely organic luminescent dyes and luminescent metal complexes. Possible classes of dyes are for example diaryl polyenes, diaryl ethenes, aryl acetylenes, oxazoles, pyrazoles, benzazoles, anthrones, quinones, cyanines, rhodamines, oxazines, phenoxazines, thiazines, phenothiazines, perylenes, terylenes, coumarins, benzoxazinones or benzothiazinones, as well as rare earth metal complexes, such as β-diketonate rare earth metal complexes or dipicolinate rare earth metal complexes, herein preferably neutrally charged rare earth metal complexes. Other classes of organic luminescent dyes can be used as well.

In particular, perylene dyes are preferably used as the dye class for luminescent dyes excitable in the visible spectral range and emitting in the visible range, due to their high light stability.

Examples of suitable luminescent dyes emitting in the infrared range are organic fluorescent dyes or luminescent metal complexes, such as IR-1048, Cy7 or Nd(TTA)$_3$ (neodymium tris-thenoyltrifluoroacetonate).

Examples of FRET systems are e.g. mixtures of a green-yellow excitable fluorescent dye and a green-yellow emitting fluorescent dye, for example a mixture with a weight ratio of 1:15 of 2,9-bis(2,6-diisopropylphenyl)anthra[2,1,9-def 6,5,10-d'e'f']diisoquinoline-1,3,8,10(2H,9H)-tetraone ($C_{48}H_{42}N_2O_4$, a green excitable perylene dye having an orange luminescence emission, hereinafter referred to as "F-orange"), and N-(2-(4-oxo-4H-benzo[d][1,3]oxazine-2-yl)phenyl)naphthalene-2-sulfonamide ($C_{24}H_{16}N_2O_4S$, a UV-excitable luminescent dye having a green luminescence emission, hereinafter referred to as "F-green").

A FRET system can also serve to read out a forensic component in a luminescent pigment. Thus, the acceptor dye can be excited not only by an energy transfer of the donor dye, but also a direct excitation of the acceptor dye can lead to its luminescence. For example, a mixture of F-Orange and F-green can be excited on the one hand in the UV-A range, e.g. at 365 nm (excitation of the F-green followed by energy transfer to F-orange). On the other hand, for a forensic test the F-orange can also be excited directly, for example by light of the wavelength 525 nm. The direct excitation of the acceptor substance can thus be employed to distinguish FRET systems from other dye systems, and offers an additional security level, which can be analyzed e.g. in a laboratory or automatically by sensors.

According to a preferred embodiment the luminescent dye therefore contains an energy transfer system (FRET system), preferably a FRET system of a UV-excitable luminescent dye as the donor and a luminescent dye excitable in the visible range as the acceptor. The acceptor is preferably a perylene dye. The acceptor is preferably employed as forensic marker.

Preferably the feature substance is an infrared absorber. Particularly preferably, the infrared absorber has no or only little absorption in the visible spectral range. According to a preferred embodiment the absorbers are narrow-band (e.g. with an FWHM ("full width at half maximum") of less than 200 nm) or sharp-band (e.g. with an FWHM of less than 30 nm) and thus absorb in a narrow spectral range. According to a further preferred embodiment the absorbers absorb in broad-band manner (e.g. with an FWHM of more than 200 nm). According to a preferred embodiment the absorption maximum of the infrared absorber is in the range from 700 nm to 900 nm, preferably in a range of 700 nm to 800 nm, and is therefore suitable to be read out via standard infrared sensors for banknotes. According to a further preferred embodiment, the absorption maximum of the infrared absorber is above 900 nm, further preferably above 950 nm, particularly preferably in the range of 1,000 nm to 1,100 nm, and is thus not detected by standard infrared sensors for banknotes, however can be detected by special infrared sensors for banknotes.

According to a preferred embodiment, the absorption maximum or a strong absorption band of the UV absorber is in the UV-A range of 315 nm to 380 nm, particularly preferably in the range of 350 nm to 380 nm. According to a further preferred embodiment, the absorption maximum or a strong absorption band of the UV absorber is in the UV-B/C range of 200 nm to 315 nm, further preferably of 220 nm to 290 nm, particularly preferably of 240 nm to 270 nm.

Suitable infrared absorbers are for example commercially available from the company Fujifilm Imaging Colorants (e.g. CCK-55), the company BASF (e.g. Lumogen IR-Absorber), or the company Epolin under the brand name Epolight. For example, Epolight 4101 absorbs in narrow-band manner at 739 nm and shows no perceptible inherent color when incorporated into a polymer in a diluted form. Likewise, for example Epolight 4831 absorbs in narrow-band manner at 1,000 nm and shows no perceptible inherent color when incorporated into a polymer in a diluted form.

Suitable UV absorbers are for example available from the company BASF under the trade names Tinuvin and Chimassorb. For example, Tinuvin 326 has a strong absorption band at 360 nm and Chimassorb 81 has a strong absorption band at 330 nm.

According to a preferred embodiment the feature substance is a switchable dye. Preferably, it is a thermochromic or photochromic dye. According to a preferred embodiment the switchable dye is a photochromic compound. Preferably, this is a photochromic compound which is switchable between a first visible state and a second visible or invisible state. The switching in one direction is preferably carried out by irradiation with UV light, while the switching back is carried out either by itself (thermally) or by irradiation with visible light.

According to a preferred embodiment the photochromic dyes are also luminescent dyes. Here, both or only one of the switching states of the dye can be capable of luminescence. The various switching states can have identical luminescent properties (e.g. emission at the same wavelength) or different luminescent properties (e.g. change of the emission wavelength after switching operation).

According to a preferred embodiment the absorption band or emission band generated by the switching operation, in particular the generated absorption band, is in the visible spectral range.

According to a further preferred embodiment the absorption band or emission band generated by the switching operation is in the infrared range, e.g. in a range of 700 nm to 900 nm.

Examples of suitable thermochromic dyes are, for example, (a) organic molecules which change their color through structural change upon a change of the temperature, such as 9,9'-bixanthylidene and 10,10'-bianthronylidene; (b) combinations of a leuco dye (e.g. spirolactones, spiropyranes) and a reversible proton donor (e.g. bisphenol A, 1,2,3-triazoles) and a phase change material (e.g. paraffin), which change their color through protonation/deprotonation of the leuco dye upon a change of the temperature; (c) dyes or metal complexes which change their color intensity in temperature-dependent manner, e.g. temperature quenching in europium complexes; and (d) combinations of several dyes having different temperature behavior (e.g. a mixture of terbium and europium complexes, such as described i.a. in the document EP 0 256 922 B1, which can luminesce red or green in temperature-dependent manner).

Here, (a) and (d) are preferred due to the clear color change, and (b) is less preferred due to the complexity and difficult implementation.

Examples of suitable photochromic dyes are for example spiropyranes, stilbenes/azastilbenes, triarylmethanes, nitrones, fulgides, naphthopyranes, spirooxazines, quinones and diaryl ethenes. Due to their high light stability diaryl ethenes are preferred. For example, the diaryl ethene BTF6 (=1,2-bis(2-methyl-1-benzothiophene-3-yl)perfluorocyclopentene) in the open ring structure absorbs in the UV range at 200 nm to 300 nm and has no perceptible absorption bands in the visible spectral range, thus is colorless. After irradiation with UV light of the wavelength 254 nm, however, it converts into the closed ring structure which has an absorption band in the visible spectral range at 530 nm, thus is colored. Upon excitation with UV light of the wavelength 315 nm both the closed and the open ring structure emit at 450 nm, thus a luminescent dye is given at the same time.

By waiting (thermal) or irradiation with visible light, e.g. light of the wavelength 400 nm, the closed ring structure can be returned to the open ring structure.

Further, it is possible to prepare more complex codings through a targeted combination (or common encapsulation) of different feature substances, and to prepare feature particles that are suitable for different machine-readable verification methods at the same time.

In addition to the feature substance, further additives can be added to the core material or the shell material, preferably to the core material.

According to a preferred embodiment, so-called plasticizers, such as diethylhexyl adipate, dibutyl phthalate or diisononyl phthalate, are added to the polymer particles. As substance classes, here there can be used diesters of phthalic acid, diesters of adipic acid and diesters of sebacic acid with longer-chain monoalcohols (2-ethylhexanol, isononanol, decyl alcohol, fatty alcohols, benzyl alcohol, glycol ether), triesters of citric acid, phosphoric acid esters of longer-chain aliphatic alcohols, dibenzoic acid esters of aliphatic alcohols, esters of fatty acids with aliphatic alcohols, diesters of polyethylene glycol ethers, esters of resin acids with longer-chain aliphatic alcohols, plasticizers based on epoxidized fatty acid esters or epoxidized oils, carbon plasticizers and chlorinated paraffins. In this manner, the mechanical properties of the polymer core can be adjusted. In particular, the absorbency of the core material for certain feature substances can be increased.

Preferably, 0.1 to 5 weight percent of plasticizer are added relative to the mass of the core material, further preferably 0.2 to 2 wt.-%, particularly preferably 0.3 to 0.6 wt.-%.

According to a further preferred embodiment UV absorbers are added to the core material. In this manner, the light resistance of the feature substance can be improved, for example.

Suitable UV absorbers are available for example from the company BASF under the trade name Tinuvin and Chimassorb, for example Chimassorb 81.

According to a further preferred embodiment dyes are added to the core material. In this manner, the intrinsic coloration of the capsules can be adjusted for example (e.g. red or blue). Likewise, dyes can be employed to modulate the excitation or emission spectra of the feature substances.

The security pigments are preferably employed for the production of value documents. This takes place preferably in the form of a printing ink, in particular for offset printing, screen printing or steel intaglio printing. Instead of introducing the pigments directly into the printing lacquer and/or the printing ink, it is also possible to produce an ink concentrate from the pigments first. Said concentrate has a pigment content of 50%, for example, and can be introduced into the printing lacquer or printing ink later. This has application-technical advantages, such as faster introduction or avoiding dusting during introduction.

Alternatively, the security pigments can also be introduced into a polymer composition, preferably to prepare a master batch, or to produce a value document substrate, a security foil, a mottling fiber or a security thread. This can be effected by extrusion, for example.

The invention will hereinafter be described in more detail with reference to embodiments.

Embodiment Example 1: Blue Luminescent Pigment 2.7 g polystyrene of the average molecular mass of 100,000 g/mol, 150 mg 4,4'-bis(2-methoxystyryl)-1,1'-biphenyl ($C_{30}H_{26}O_2$) and 25 mg dibutyl phthalate are dissolved in 50 g dichloromethane while stirring (solution 1A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 1B).

2.5 g Teepol 610 S (Sigma Aldrich) are dissolved in 247.5 g water (solution 1C).

The solution 1A is added to the solution 1C and dispersed for 30 seconds with a dispersion tool (Ultraturrax). During this time, 20 ml of solution 1B and 1 ml acetic acid are added. Subsequently, the dispersion is stirred further with a magnetic stirrer.

After 2 h stirring at room temperature, the dispersion is heated to 39° C. and maintained at this temperature for 1.5 h to evaporate the dichloromethane. Subsequently, an additional 20 ml of the solution 1B are added and the temperature is raised to 70° C. This temperature is maintained for a further 1.5 hours. The particles obtained are separated from the solution, washed with water and dried at 60° C.

The particles are incorporated at a weight fraction of 15% into an offset lacquer (Sicpa Holding SA) with a three-roll mill. The lacquer is printed on a proof strip with a proof thickness of 2 g/m².

Upon irradiation with UV light of the wavelength 365 nm the previously colorless proof luminesces blue.

The proof shows a high stability against organic solvents and aqueous acids and bases (reaching level 4 "no visible change"), whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

Embodiment Example 2: Yellow Luminescent Pigment 2.7 g polymethyl methacrylate (PMMA) of the average molecular mass of 80,000 g/mol, 150 mg N-(2-(4-oxo-4H-benzo[d][1,3]oxazine-2-yl)phenyl)naphtalene-2-sulfonamide ($C_{24}H_{16}N_2O_4S$) and 10 mg 2,9-bis(2,6-diisopropylphenyl)anthra[2,1,9-def:6,5,10-d'e'f']diisoquinoline-1,3,8,10(2H,9H)-tetraone ($C_{48}H_{42}N_2O_4$) are dissolved in 50 g chlorofom while stirring (solution 2A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 2B).

2.5 g sodium dodecylsulfate are dissolved in 247.5 g water (solution 2C).

The solution A is added to the solution 2C and dispersed for 30 seconds with a dispersion tool (Ultraturrax). During this time, 20 ml of solution 2B and 1 ml acetic acid are added. Subsequently, the dispersion is stirred further with a magnetic stirrer.

The dispersion is stirred for 12 h at room temperature to evaporate the chloroform. Subsequently, an additional 20 ml of the solution 2B are added and the temperature is raised to 70° C. This temperature is maintained for a further 2 hours. The particles obtained are separated from the solution, washed with water and dried at 60° C.

The particles are incorporated at a weight fraction of 15% into an offset lacquer (hubergroup Deutschland GmbH) with a three-roll mill. The lacquer is printed on a proof strip with a proof thickness of 2 g/m².

Upon irradiation with UV light of the wavelength 365 nm the previously softly orange-tinted proof luminesces yellow.

The proof shows a high stability against organic solvents and aqueous acids and bases (reaching level 4 "no visible change"), whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

Embodiment Example 3: IR Absorber Pigment 2.7 g polystyrene of the average molecular mass of 192,000 g/mol and 150 mg IR absorber CKK-55 (Fujifilm Imaging Colorants) are dissolved in 50 g chloroform while stirring (solution 3A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 3B).

2.5 g Teepol 610 S (Sigma Aldrich) are dissolved in 247.5 g water (solution 3C).

The solution 3A is added to the solution 3C and dispersed for 30 seconds with a dispersion tool (Ultraturrax). During this time, 20 ml of solution 3B and 1 ml acetic acid are added. Subsequently, the dispersion is stirred further with a magnetic stirrer.

After 2 h stirring at room temperature, the dispersion is heated to 39° C. and maintained at this temperature for 1.5 h to evaporate the chloroform. Subsequently, an additional 20 ml of the solution 3B are added and the temperature is raised to 70° C. This temperature is maintained for a further 1.5 hours. The particles obtained are separated from the solution, washed with water and dried at 60° C.

The particles are incorporated at a weight fraction of 15% into a water-based screen printing ink (Pröll KG) with a three-roll mill. The lacquer is printed on a proof strip with a proof thickness of 6 g/m$^2$.

The proof shows an absorption band in the NIR range at 850 nm.

The proof shows a high stability against organic solvents and aqueous acids and bases (decrease of the absorption band at 850 nm by less than 5%), whereas proofs of the pure absorber are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

Embodiment Example 4: Photochromic Pigment 2.7 g polymethyl methacrylate (PMMA) of the average molecular mass of 100,000 g/mol and 150 mg cis-1,2-dicyano-1,2-bis(2,4,5-trimethyl-3-thienyl)ethene ($C_{18}H_{18}N_2S_2$) are dissolved in 50 g dichloromethane while stirring (solution 4A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 4B).

2.5 g sodium dodecylsulfate are dissolved in 247.5 g water (solution 4C).

The solution 4A is added to the solution 4C and dispersed for 30 seconds with a dispersion tool (Ultraturrax). During this time, 20 ml of solution 4B and 1 ml acetic acid are added. Subsequently, the dispersion is stirred further with a magnetic stirrer.

The dispersion is stirred for 30 minutes and subsequently stirred at 500 mbar negative pressure for 1 h to evaporate the dichloromethane. Subsequently, an additional 20 ml of the solution 4B are added and the temperature is raised to 70° C. This temperature is maintained for a further 1.5 hours. The particles obtained are separated from the solution, washed with water and dried at 60° C.

The particles are incorporated at a weight fraction of 15% into an offset lacquer (Sicpa Holding SA) with a three-roll mill. The lacquer is printed on a proof strip with a proof thickness of 2 g/m$^2$.

Upon irradiation with UV light of the wavelength 330 nm, the proof changes color from colorless to red, and returns to its initial color thermally or through irradiation with visible light (e.g. of the wavelength 520 nm).

The proof shows a high stability against organic solvents and aqueous acids and bases (reaching level 4 "no visible change"), whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

Embodiment Example 5: Red Luminescent Pigment 2.7 g polymethyl methacrylate (PMMA) of the average molecular mass of 80,000 g/mol and 150 mg Eu(TTA)$_3$(TPPO)$_2$ (TTA=thenoyltrifluoroacetone; TPPO=triphenylphosphine oxide) are dissolved in 50 g dichloromethane while stirring (solution 5A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 5B).

2.5 g sodium dodecylsulfate are dissolved in 247.5 g water (solution 5C).

The solution 5A is added to the solution 5C and dispersed for 30 seconds with a dispersion tool (Ultraturrax). During this time, 20 ml of solution 5B and 1 ml acetic acid are added. Subsequently, the dispersion is stirred further with a magnetic stirrer.

The dispersion is stirred for 30 minutes and subsequently stirred at 500 mbar negative pressure for 1 h to evaporate the dichloromethane. Subsequently, an additional 20 ml of the solution 5B are added and the temperature is raised to 70° C. This temperature is maintained for a further 1.5 hours. The particles obtained are separated from the solution, washed with water and dried at 60° C.

The particles are incorporated at a weight fraction of 15% into an offset lacquer (Sicpa Holding SA) with a three-roll mill. The lacquer is printed on a proof strip with a proof thickness of 2 g/m$^2$.

Upon irradiation with UV light of the wavelength 365 nm the previously colorless proof luminesces red.

The proof shows a high stability against organic solvents and aqueous acids and bases (reaching level 4 "no visible change"), whereas proofs of the pure dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

Embodiment Example 6: UV Absorber Pigment with Blue Inherent Color 2.7 g polystyrene of the average molecular mass of 192,000 g/mol, 100 mg Oil Blue 35 (1,4-bis(butylamino)-anthraquinone, $C_{22}H_{26}N_2O_2$) and 50 mg 2-hydroxy-4-(octyloxy)benzophenone $(CH_3(CH_2)_7OC_6H_3(OH)COC_6H_5)$ are dissolved in 50 g ethyl acetate while stirring (solution 6A).

7.8 g melamine and 11.1 g paraformaldehyde are stirred in 100 g water at 60° C. for 60 minutes, wherein a clear solution is formed. The solution is filtered through a filter paper to remove any possibly present undissolved particles (solution 6B).

2.5 g Teepol 610 S (Sigma Aldrich) are dissolved in 247.5 g water (solution 6C).

The solution 6A is added to the solution 6C and dispersed for 30 seconds with a dispersion tool (Ultraturrax). During this time, 20 ml of solution 6B and 1 ml acetic acid are added. Subsequently, the dispersion is stirred further with a magnetic stirrer.

The dispersion is stirred for 12 h at room temperature to evaporate the ethyl acetate. Subsequently, an additional 20 ml of the solution 6B are added and the temperature is raised to 70° C. This temperature is maintained for a further 1.5 hours. The particles obtained are separated from the solution, washed with water and dried at 60° C.

The particles are incorporated at a weight fraction of 15% into a water-based screen printing ink (Pröll KG) with a three-roll mill. The lacquer is printed on a proof strip with a proof thickness of 6 g/m².

The proof is blue and shows an absorption band in the UV range at 280-350 nm.

The proof shows a high stability against organic solvents and aqueous acids and bases (reduction of the absorption bands in the visible and/or UV range by less than 10%), whereas proofs of the pure absorber and/or dye are not resistant.

The quantitative determination of the stability against polar organic solvents (test substance ethyl acetate), non-polar organic solvents (test substance toluene), aqueous acids (test substance HCl, 5 weight percent), aqueous bases (test substance NaOH, 2 weight percent), and aqueous redox-active solutions (test substance sodium hypochlorite solution, 5% active chlorine) in accordance with test method A30 and acetone in accordance with test method A5 yields respectively a stability of more than 95%.

The invention claimed is:

1. A method for producing a security pigment of core-shell particles, comprising a solid core based on a thermoplastic polymer, a shell based on a condensation polymer and an organic or metalorganic feature substance present in dissolved or finely distributed form in the core, having
    a) the step of dissolving the feature substance together with the thermoplastic polymer in an organic solvent and dispersing the obtained solution in water or an aqueous solution by means of a surfactant;
    b) supplying at a certain pH value the prepolymer units to be polymerized in a condensation reaction, in order to achieve the condensation of the shell-forming polymer around the dispersed droplets of the organic solvent;
    c) removing the organic solvent in order to form the core-shell particles with a solid core;
   and optionally d) reinforcing the shell of the core-shell particles by adding further prepolymer units to be polymerized.

2. The method according to claim 1, wherein the thermoplastic polymer is selected from polystyrene (PS), polyacrylates, polyethylene (PE), polypropylene (PP), polycarbonates (PC), polyamides (PA), polyurethanes (PU), polyureas (PH), polyethylene terephthalate (PET) or other polyesters, from polystyrene (PS) or from one of the polyacrylates polymethyl methacrylate (PMMA), polyvinyl acetate (PVAC), polyvinyl chloride (PVC), polyacrylonitrile (PAN).

3. The method according to claim 1, wherein the condensation polymer is selected from aminoplasts, phenoplasts, melamine-formaldehyde resins (MF), melamine-phenol-formaldehyde resins (MPF), phenol-formaldehyde resins (PF), urea-formaldehyde resins (UF), melamine-guanidine-formaldehyde resins or phenol-resorcin-formaldehyde resins.

4. The method according to claim 1, wherein the feature substance is a fluorescent or phosphorescent or photochromic or thermochromic feature substance or a UV or IR or VIS absorption dye.

5. The method according to claim 1, wherein the security pigment is stable against toluene, ethyl acetate, hydrochloric acid (5%), sodium hydroxide solution (2%) and sodium hypochlorite solution (5% active chlorine) in accordance with the test method A5, wherein the feature intensity remaining after the test is higher than 80% of the initial intensity.

6. The method according to claim 1, wherein the thermoplastic polymer contained in the core of the obtained core-shell particle is polymethyl methacrylate (PMMA) or polystyrene (PS) and the shell of the obtained core-shell particle is of melamine-formaldehyde resin (MF).

* * * * *